UNITED STATES PATENT OFFICE.

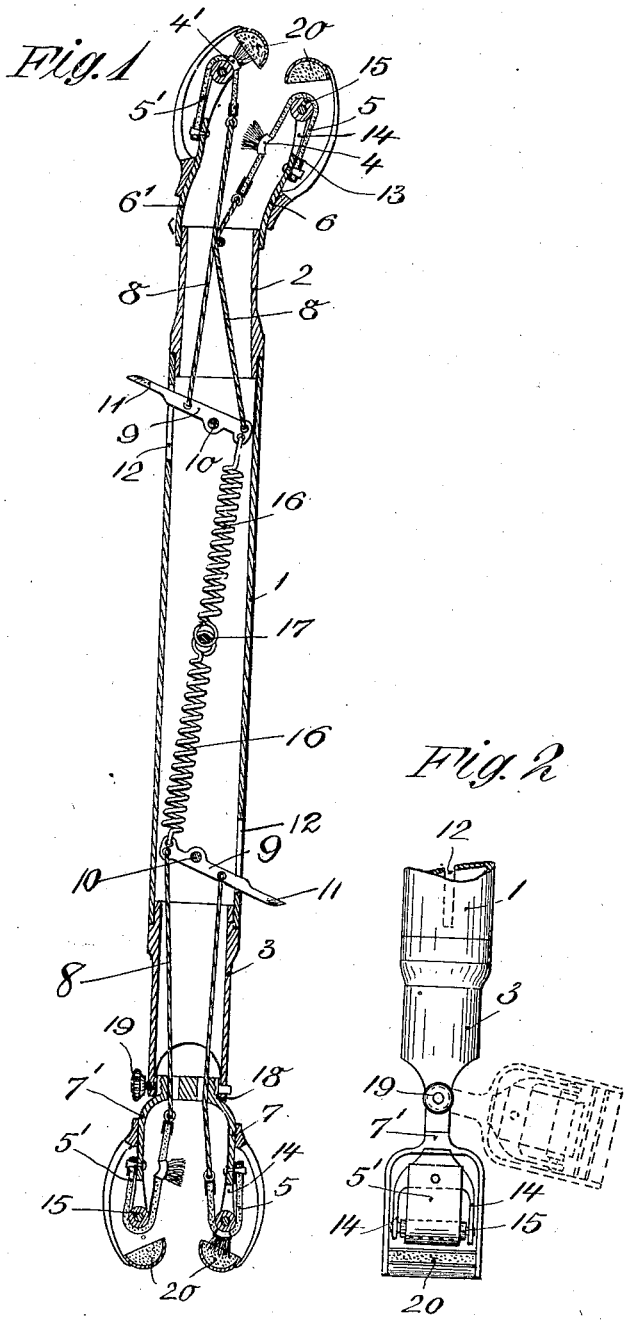

GREGOR ENGEL, OF CHARLOTTENBURG, GERMANY.

TOOTH-BRUSH.

No. 827,965.　　　Specification of Letters Patent.　　　Patented Aug. 7, 1906.

Application filed August 31, 1905. Serial No. 276,592.

*To all whom it may concern:*

Be it known that I, GREGOR ENGEL, dentist, a citizen of Germany, residing at 45 Goethestrasse, Charlottenburg, near Berlin, in the Kingdom of Prussia and Empire of Germany, have invented a new Tooth-Brush, of which the following is a specification.

The present invention refers to a toothbrush in which the brushes are arranged to move up and down, so that the teeth can be cleaned in vertical direction in the known usual manner, as is necessary for a thorough and sanitary cleaning of the teeth.

The invention consists in the brushes being arranged on positively-moved straps, by which they are taken along the inside and outside of the teeth. This arrangement allows of simultaneously cleaning the teeth both on the outside and inside.

A further advantage derived from the brushes being arranged on such straps, especially if such straps are elastic, is that a soft and even brushing is possible, which is of importance for a good preservation of the teeth.

In the attached drawings is shown a toothbrush exemplifying the present invention, Figure 1 being a sectional side view; Fig. 2, a front view of part of the invention.

On the ends of the hollow handle-bar 1 hollow detachable heads 2 3 are provided.

The brushes 4 are arranged on straps 5, suitably made of elastic material—for instance, caoutchouc. The one end of these straps 5 is attached to flexible arms 6 6' and 7 7', the other to other straps or cords 8 8' pass through the hollow heads 2 and 3 into the handle 1 and are here attached to levers 9, which are pivoted at 10. These levers 9 have handles 11 on their free ends projecting out of the handle-pieces 1 through slots 12. The arms 6 6' 7 7' are forked at 13. Between the forks 14 loose rolls 15 are inserted on which the straps 5 glide. Coil-springs 16 in the hollow handle have their inner ends secured, as at 17, and their outer ends attached to the inner ends of the levers 9.

The arms 6 6' are bent at an angle with reference to the handle 1. The arms 7 7' are flexibly connected to the handle 1 for angular movement with relation thereto. They are here shown as pivotally mounted, as at 18, and as provided with a screw 19 to clamp them in any required position. The said arms 6 6' and 7 7' are provided at their outer ends with cups 20 to contain tooth-cleaning paste.

The operation of my improved toothbrush is as follows: The arms 6 6' are for use when cleaning the front teeth. The arms 7 7' are for use when cleaning the back teeth. The brush is held in an upright position with the arms at the lower end thereof on the outer and inner sides of the teeth to be cleaned and with the cups bearing against the corresponding sides of the gums and serving as supports for the device. The appropriate lever 9 is then operated, and it will be understood that the operation of such lever will cause the brushes to move up and down, one against the inner side of the teeth and the other against the outer side thereof and to effectually brush and cleanse them. Each brush as it passes its cup 20 will take up some of the paste from such cup and apply it to the teeth.

I do not desire to limit myself to the precise construction herein shown and described, as modifications may be made therein within the scope of the invention as defined by the appended claims.

What I claim is—

1. In a tooth-brush, the combination of a handle having means at one end thereof to bear against the gums, a brush, and means to impart reciprocatory movement to the brush independently of the handle.

2. In a tooth-brush, the combination of a handle, oppositely-disposed brushes at one end of the handle, and means to impart reciprocatory movement to said brushes independently of the handle.

3. In a tooth-brush, the combination of a handle, oppositely-disposed brushes at one end of the handle, and means to cause said brushes to move simultaneously in reverse directions independently of the handle.

4. In a tooth-brush, the combination of a handle, a brush, means to impart reciprocatory movement to such brush independently of the handle, and means to supply the brush with a dentifrice.

5. In a tooth-brush, the combination of a handle, arms at one end thereof, direction-rollers carried by said arms, straps engaging said direction-rollers, a lever fulcrumed to the handle and to which the straps are connected for reciprocatory movement by the handle, and brushes oppositely disposed and attached to and movable with the said straps.

6. In a tooth-brush, the combination of a handle, arms at one end thereof, direction-rollers carried by said arms, straps engaging said direction-rollers, a lever fulcrumed to the handle and to which the straps are connected for reverse, simultaneously-reciprocatory movement by the lever, and brushes oppositely-disposed and attached to and removable with the said straps.

7. In a tooth-brush, the combination of a handle, arms at one end thereof, a lever fulcrumed to the handle, oppositely-disposed elastic straps attached to the arms and connected to the lever, for the purpose set forth, and brushes on the opposing sides of the said elastic straps and movable in reverse directions therewith when the lever is operated.

8. In a tooth-brush, the combination of a handle, arms at one end thereof, a dentifrice-containing cup secured to the arms, direction-rollers mounted on the arms, straps engaging the said rollers, brushes on opposing sides of the straps, and a lever fulcrumed to the handle and to which said straps are connected for movement thereby to impart reciprocatory movement to the brushes.

9. In a tooth-brush, the combination of handle, a plurality of brushes mounted to bear on the inner and outer sides of the teeth, and means to impart brushing movement to such brushes.

In testimony whereof I have hereunto set my hand in presence of two subscribing witnesses.

GREGOR ENGEL.

Witnesses:
   WOLDEMAR HAUPT,
   HENRY HASPER.